United States Patent
Sakamaki et al.

(10) Patent No.: US 10,663,580 B2
(45) Date of Patent: May 26, 2020

(54) RADAR SIGNAL PROCESSING DEVICE

(71) Applicant: Mitsubishi Electric Corporation, Tokyo (JP)

(72) Inventors: Hiroshi Sakamaki, Tokyo (JP); Masashi Mitsumoto, Tokyo (JP); Nobuhiro Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 174 days.

(21) Appl. No.: 15/569,444

(22) PCT Filed: May 29, 2015

(86) PCT No.: PCT/JP2015/065529
§ 371 (c)(1),
(2) Date: Oct. 26, 2017

(87) PCT Pub. No.: WO2016/194036
PCT Pub. Date: Dec. 8, 2016

(65) Prior Publication Data
US 2018/0081052 A1 Mar. 22, 2018

(51) Int. Cl.
*G01S 13/931* (2020.01)
*G01S 13/58* (2006.01)
(Continued)

(52) U.S. Cl.
CPC .............. *G01S 13/931* (2013.01); *G01S 7/41* (2013.01); *G01S 7/411* (2013.01); *G01S 7/415* (2013.01);
(Continued)

(58) Field of Classification Search
CPC . G01S 7/41; G01S 7/411; G01S 7/412; G01S 7/415; G01S 13/931
See application file for complete search history.

(56) References Cited

U.S. PATENT DOCUMENTS 5,574,463 A * 11/1996 Shirai .................. G01S 7/4802
342/115
6,249,243 B1 * 6/2001 Takagi .................. G01S 7/352
342/108
(Continued)

FOREIGN PATENT DOCUMENTS

CN 101178773 A 5/2008
EP 2 784 538 A2 10/2014
(Continued)

OTHER PUBLICATIONS

International Search Report for PCT/JP2015/065529 dated Aug. 25, 2015 [PCT/ISA/210].
(Continued)

*Primary Examiner* — Peter M Bythrow
(74) *Attorney, Agent, or Firm* — Sughrue Mion, PLLC; Richard C. Turner

(57) ABSTRACT

A highly accurate object identification is performed. A first feature quantity related to a relative distance and a relative speed to an object, the direction and the reflection intensity of the object, which are extracted by a first feature quantity extraction block, is made identical in time series in a data storage processing block; a second feature quantity is extracted in a second feature quantity extraction block; and a category of the object is determined by an object determination block on the basis of an attribution degree to the distribution of the second feature quantity related to a predetermined category calculated by an attribution degree calculation block.

10 Claims, 5 Drawing Sheets

(51) Int. Cl.
  *G01S 7/41* (2006.01)
  *G01S 13/42* (2006.01)
  *G01S 13/46* (2006.01)
(52) U.S. Cl.
  CPC .............. *G01S 13/42* (2013.01); *G01S 13/46* (2013.01); *G01S 13/582* (2013.01); *G01S 13/584* (2013.01); *G01S 2013/462* (2013.01); *G01S 2013/93185* (2020.01)

(56) References Cited

U.S. PATENT DOCUMENTS

| | | | | |
|---|---|---|---|---|
| 6,377,205 | B1* | 4/2002 | Eckersten | G01S 7/412 342/27 |
| 6,518,916 | B1* | 2/2003 | Ashihara | G01S 7/412 342/133 |
| 7,053,817 | B2* | 5/2006 | Nakano | G01S 7/411 342/90 |
| 8,077,075 | B2* | 12/2011 | Randler | G01S 13/345 342/104 |
| 8,199,046 | B2* | 6/2012 | Nananni | G01S 13/931 340/425.5 |
| 8,854,251 | B2* | 10/2014 | Tokoro | G01S 13/34 342/104 |
| 2003/0164792 | A1* | 9/2003 | Jahangir | G01S 7/415 342/90 |
| 2004/0246167 | A1* | 12/2004 | Kumon | G01S 7/41 342/70 |
| 2005/0099332 | A1* | 5/2005 | Nakano | G01S 7/411 342/70 |
| 2007/0253625 | A1* | 11/2007 | Yi | G01S 7/412 382/228 |
| 2008/0111733 | A1* | 5/2008 | Spyropulos | G01S 7/412 342/189 |
| 2009/0027180 | A1* | 1/2009 | Shibata | G01S 7/41 340/435 |
| 2010/0097200 | A1* | 4/2010 | Hilsebecher | G01S 7/412 340/436 |
| 2011/0006941 | A1* | 1/2011 | Samukawa | G01S 13/345 342/70 |
| 2013/0002470 | A1* | 1/2013 | Kambe | G01S 13/867 342/55 |
| 2014/0049419 | A1* | 2/2014 | Lehning | G08G 1/0116 342/107 |
| 2014/0049420 | A1* | 2/2014 | Lehning | G01S 7/41 342/109 |
| 2014/0292559 | A1* | 10/2014 | Asanuma | G01S 13/06 342/133 |
| 2015/0355315 | A1* | 12/2015 | Shimizu | G01S 13/34 342/107 |
| 2015/0362592 | A1* | 12/2015 | Mizutani | G01S 13/931 342/118 |
| 2015/0378014 | A1* | 12/2015 | Koudelka | G01S 13/04 342/25 A |
| 2016/0003935 | A1* | 1/2016 | Olshansky | G01S 7/415 342/70 |
| 2016/0003941 | A1* | 1/2016 | Satou | G01S 13/931 342/118 |

FOREIGN PATENT DOCUMENTS

| | | |
|---|---|---|
| JP | 10-206531 A | 8/1998 |
| JP | 2004-191131 A | 7/2004 |
| JP | 2004-361154 A | 12/2004 |
| JP | 2009-031053 A | 2/2009 |
| JP | 4665948 B2 | 4/2011 |
| JP | 4905512 B2 | 3/2012 |
| JP | 2013-238452 A | 11/2013 |
| JP | 5543061 B2 | 7/2014 |
| WO | 2006/025453 A1 | 3/2006 |
| WO | 2014/104298 A1 | 7/2014 |
| WO | 2014/123112 A1 | 8/2014 |

OTHER PUBLICATIONS

Extended European Search Report dated Jan. 4, 2019 issued by the European Patent Office in counterpart application No. 15894071.8.
Communication dated Feb. 26, 2020 from the State Intellectual Property Office of the P.R.C. in application No. 201580080067.3.

* cited by examiner

RADAR SIGNAL PROCESSING DEVICE

CROSS REFERENCE TO RELATED APPLICATIONS

This application is a National Stage of International Application No. PCT/JP2015/065529 filed May 29, 2015, the contents of all of which are incorporated herein by reference in their entirety.

TECHNICAL FIELD

The present invention relates to a radar signal processing device of a vehicle-mounted radar device and, more particularly, relates to a technique for supporting a determination as to whether or not braking control should be performed by identifying a reflected object as a predetermined category.

BACKGROUND ART

Formerly, measurement results, such as a relative distance and a relative speed between one's own vehicle and a reflected object, a direction, and reflection intensity, which are measured by a vehicle-mounted radar device, are utilized for a vehicle-mounted application for improving vehicle's safeness and amenity. The vehicle-mounted application is, for example, a collision damage mitigation braking system that reduces damage at the time when one's own vehicle collides with an anterior obstacle and an adaptive cruise control system that follows an anterior vehicle.

In the application such as this, a determination is made as to whether or not one's own vehicle should be braked on the basis of the measurement results per se related to an object to be targeted or a new feature quantity derived from the measurement results.

For example, in Patent Document 1, a target's height from the road surface is estimated from the power distribution of the target (a generation pattern of a null point due to multipath propagation) and a determination is made as to whether or not the target is a subject in which one's own vehicle should be braked.

Furthermore, in Patent Document 2, the height of an object is estimated by checking an amplitude pattern dictionary (database) preliminarily created by the use of various sorts of objects whose heights are known.

As a different example, in Patent Document 3, identification is performed as to whether or not a subject is a vehicle or a person to determine as to whether or not the subject is a braking subject on the basis of received power (radar cross section) and a variation (standard deviation) of the difference between received power in an ascending section and a descending section of frequencies in a frequency modulated continuous wave (FMCW) system.

PRIOR ART DOCUMENT

Patent Document

Patent Document 1: Japanese Patent Registration No. 4905512
Patent Document 2: Japanese Patent Registration No. 5543061
Patent Document 3: Japanese Patent Registration No. 4665948

SUMMARY OF THE INVENTION

Problems to be Solved by the Invention

Since the known devices are configured as described above, a determination is performed on the basis of only a feature quantity derived from signal intensity in Patent Document 1 and Patent Document 2; and accordingly, a problem exists in that estimation accuracy deteriorates when the measurement results cannot be normally obtained.

Furthermore, in a system of checking the dictionary as shown in Patent Document 2, a large number of data needs to be obtained for creating the dictionary which is for performing a highly accurate estimation, and a high calculation load and a large capacity of memory are generally required for checking; and accordingly, a problem exists in that costs are increased.

Moreover, in a method of Patent Document 3, the braking subject/non-braking subject can be narrowed down by preliminarily identifying an object and thus an improvement in the final determination accuracy can be expected. However, the radar cross section is changed by a beam pattern, an object's material, a posture, and a distance; and accordingly, it is conceivable that a stable determination is difficult. Additionally, a certain level of data accumulation is required for calculating the variations; and accordingly, for example, it is conceivable that handling for a temporally tight situation such as a sudden lane change of an anterior vehicle might be delayed.

The present invention has been made to solve the foregoing problem, and an object of the present invention is to obtain a radar signal processing device which identifies an object by the use of features of the object extracted from a radar measurement value and is capable of performing a highly accurate determination of a braking subject and a non-braking subject.

Means for Solving the Problems

A radar signal processing device of the present invention includes: a first feature quantity extraction block which extracts information as a first feature quantity at a constant time cycle from a received signal of a radar, the information being related to at least a relative distance and a relative speed to an object about a plurality of objects and the direction and the reflection intensity of the object; a data storage processing block which stores the first feature quantity and associates a plurality of the first feature quantities with the same object in time series over a plurality of cycles; a second feature quantity extraction block which extracts a second feature quantity from the first feature quantity in the data storage processing block; an attribution degree calculation block which calculates an attribution degree to the distribution of the second feature quantity related to a preliminarily defined category; and an object determination block which determines the category of the object on the basis of the attribution degree.

Advantageous Effect of the Invention

The radar signal processing device of the present invention determines the category (kind) of the object by regarding a change quantity for a short time of the reflection intensity of the object obtained by the radar as a feature quantity, whereby a highly accurate object identification can be achieved for a short time and/or from a small number of measurement points.

Furthermore, the radar signal processing device of the present invention determines the category (kind) of the object on the basis of a plurality of feature quantities of the object obtained by the radar, whereby a highly accurate object identification can be achieved even when there is a missing and the like.

MODE FOR CARRYING OUT THE INVENTION

Embodiment 1

Figure 1:
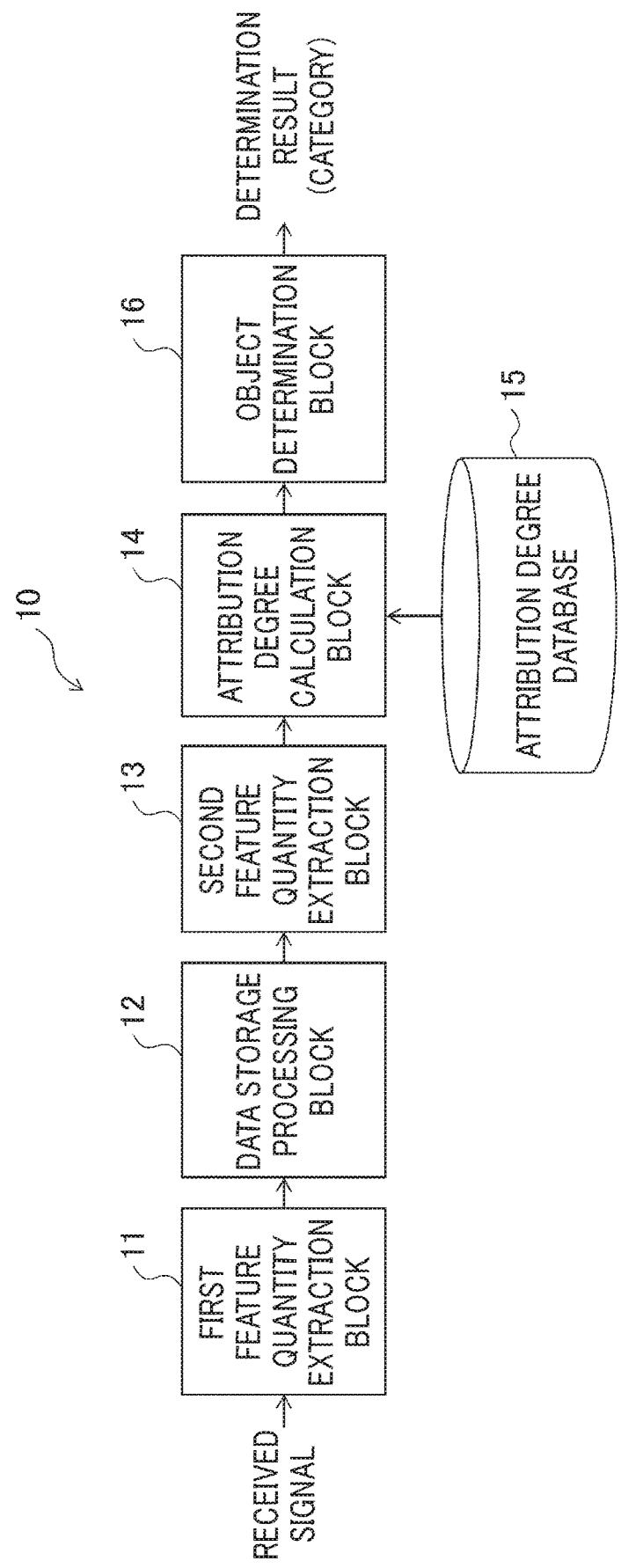
FIG. 1 is a configuration diagram showing a radar signal processing device according to Embodiment 1 of the present invention.

FIG. 1 is a configuration diagram showing a radar signal processing device of a vehicle-mounted radar device (also referred to as a "radar") according to Embodiment 1 of the present invention.

A radar signal processing device 10 shown in FIG. 1 includes: a first feature quantity extraction block 11, a data storage processing block 12, a second feature quantity extraction block 13, an attribution degree calculation block 14, an attribution degree database 15, and an object determination block 16.

Incidentally, a portion which radiates a radio wave to an object (not shown in the drawing) and receives a reflection wave from the object (also referred to as "reflected object") and a system thereof (FMCW system, frequency modulated interrupted continuous wave (FMICW) system, pulse Doppler system, and the like), a portion that performs the entire control, and the like are equivalent to a general vehicle-mounted radar; and therefore, their description will be omitted.

The first feature quantity extraction block 11 calculates at least a relative distance, a relative speed, a direction, and reflection intensity, which are related to the object from an obtained received signal. Hereinafter, these are referred to as a first feature quantity. More specifically, the first feature quantity extraction block 11 extracts information as the first feature quantity at a constant time cycle from the received signal of the radar, the information being related to at least the relative distance and the relative speed to the object and the direction and the reflection intensity of the object about a plurality of the objects. In this regard, however, the first feature quantity not used in determination processing of a subsequent stage is not necessarily obtained. Incidentally, when there exist a plurality of the reflected objects, the first feature quantity related to a plurality of objects is calculated. Furthermore, the direction in the first, feature quantity includes an output result by known super-resolution processing, such as estimation of signal parameters via rotational invariance techniques (ESPRIT) and multiple signal classification (MUSIC). Furthermore, the first feature quantity is one obtained at a predetermined cycle (for example, 100 msec).

The data storage processing block 12 stores the first feature quantity outputted from the first feature quantity extraction block 11 and gives, for example, the same ID (number) to those related to the same reflected object about the stored first feature quantity. More specifically, a time series of the first feature quantity (relative distance, relative speed, direction, and received power) to which the same ID is given for each reflected object is stored in the data storage processing block 12. More specifically, the data storage processing block 12 associates a plurality of the first feature quantities with the same object in time series over a plurality of cycles. The first feature quantity is made identical in time series in the data storage processing block 12.

The second feature quantity extraction block 13 calculates a second feature quantity, such as a maximum value (maximum detection distance) of the relative distance, a received power value, a change quantity of the received power value, and wave number information from the first feature quantity.

Incidentally, the received power value can be such that a rapid change caused by noise, multipath propagation, and the like from reflection intensity obtained as the first feature quantity is suppressed.

Furthermore, the change quantity of the received power value can be set to the difference (or ratio) between the current observation value and its preceding observation value.

Additionally, the wave number information can be such that, for example, the number of reflected waves from the object is one wave or two waves (plurality) from a result of estimation of the number of waves.

Moreover, in addition to those mentioned above, the second feature quantity can be other feature quantity obtained by the use of the first feature quantity; for example, a standard deviation, a maximum value, and the difference between the maximum value and the minimum value of the received power value in a predetermined distance range or in a predetermined observation point can be added.

The attribution degree calculation block 14 calculates a value (attribution degree) for each category (kind) of each feature quantity of the second feature quantity inputted from the second feature quantity extraction block 13 on the basis of the distribution of attribution degree for each second feature quantity obtained from an attribution degree database 15. More specifically, the attribution degree calculation block 14 calculates the attribution degree to the distribution of the second feature quantity related to the preliminarily defined category.

The attribution degree database 15 quantifies and stores: the distribution of the second feature quantity obtained by preliminarily observing several examples about the preliminarily defined categories; the distribution of the second feature quantity based on theoretical values derived from transmission power, distance, antenna gain, reflection cross section, and the like; and properties based on experimental knowledge related to the categories.

The object determination block 16 determines to which category the object belongs on the basis of the attribution degree for each category related to the object inputted from the attribution degree calculation block 14, more specifically, determines a kind of the object (for example, vehicle, person, low position (height) object capable of being overridden, and the like) and outputs the result of the determination.

Incidentally, after that, for example, the determination result is used for braking control by a control block (not shown in the drawing).

Next, operation will be described.

First, in the first feature quantity extraction block 11, the first feature quantity (relative distance, relative speed, direction, and reflection intensity) is calculated by the use of a received signal inputted for each predetermined observation cycle. Incidentally, since the first feature quantity is based on a general system in which the relative distance, the relative speed, the direction, and the reflection intensity are calculated in the radar, detailed description will be omitted.

Next, in the data storage processing block 12, the first feature quantity inputted from the first feature quantity extraction block 11 is stored; objects related to the same reflected object are made to correspond to each other by tracking processing using, for example, a Kalman filter together with the first feature quantity for several past observations stored until then; and the same identification data (ID) (number) to the same reflected object and a time tag in which the update time of data is written or an order tag in which the input order of data is written are given. Incidentally, since the rapid change due to noise and/or multipath propagation is generally superimposed on the reflection intensity obtained as the first feature quantity, moving average by a predetermined distance range or a predetermined observation point is performed in order to obtain a stable determination result at a subsequent stage.

Incidentally, in the data storage processing block 12, for example, the first feature quantity in which a state where the first feature quantity of the same ID is not updated (added) reaches the number of predetermined observations is eliminated in series, whereby a memory space of the data storage processing block 12 can be saved.

Next, in the second feature quantity extraction block 13, the second feature quantity such as the maximum detection distance, the received power value, the change quantity of the received power value, and the wave number information is calculated by the use of the first feature quantity.

The maximum detection distance is a feature quantity that represents a maximum value of a target relative distance. Generally, since an object having a certain height, such as a vehicle and a person is detected from a long distance, the maximum detection distance has a large tendency. On the other hand, since the low position (height) object capable of being overridden is detected for the first time at a relatively short distance, the maximum detection distance has a small tendency.

The received power value is a feature quantity that represents the reflection intensity of the object. Generally, an object having a high radar cross section and material of metal etc., such as a vehicle, is high in reflection intensity value at the same distance. On the other hand, since the person is smaller in the radar cross section than the vehicle, the reflection intensity value is smaller than the vehicle; however, since the person can take various postures, a range of value of the reflection intensity value is large. Furthermore, for example, the low position (height) object capable of being overridden, such as a joint of a road surface, grating, and the like is small in the received power value at a relatively long distance; however, in the case of approaching, the influence of reflection from an edge portion becomes large and thus the received power value has a relatively large value.

Figures 2, 3:
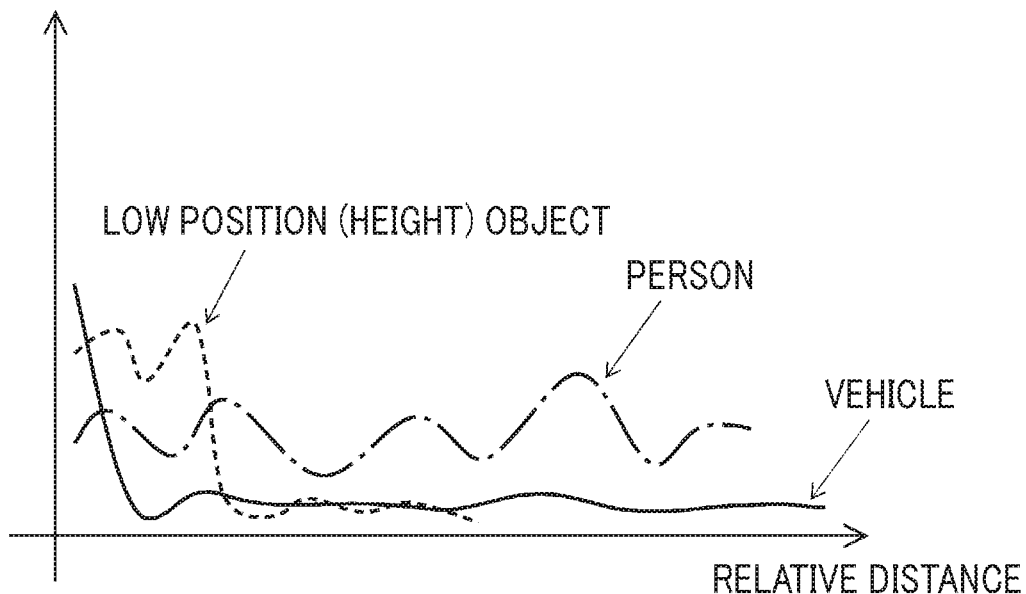
FIG. 2 is an explanation view exemplarily showing a change quantity of a received power value to a distance change in the radar signal processing device according to Embodiment 1 of the present invention.
FIG. 3 is an explanation view exemplarily showing the distribution of an attribution degree in the radar signal processing device according to Embodiment 1 of the present invention.

A change quantity of the received power value is a feature quantity defined by the difference or the ratio between the received power values at the current and the latest observation of the received power value. FIG. 2 is a typical view showing the change quantity of the received power value in a distance change. Generally, in a situation approaching to an object (situation where a relative distance between one's own vehicle and an object becomes small), the change quantity of the received power value is transitioned while keeping relatively small in the case of the vehicle except for rapid fluctuation of received power due to multipath propagation. Furthermore, in the case of the person, since the radar cross section changes, the change quantity of the received power value is transitioned more largely than the vehicle. Moreover, in the case of the low position (height) object capable of being overridden, the change quantity of the received power value is transitioned small at a long distance as in the vehicle and becomes large by the influence of edges and the like as approaching from a certain distance.

The wave number information is a feature quantity that represents the number of reflection points from the same object and the direction, which are obtained during angle measurement (super-resolution). For example, in the case of the vehicle, the number of the reflection points is one point or plural points according to a distance. Then, it becomes: a state where the number of the reflection points is clearly plural (when the reflection points have a predetermined direction difference); or a state where the number of the reflection points is not clear, but is plural (directions of the reflection points are closed or one side thereof is out of angle measurement, or the like). Although it is true also in the case of the person and the low position (height) object, such a state is anticipated to be different in the vehicle, the person, and the low position (height) object. The wave number information expresses such each state by a number, for example, 1, 2, . . . .

Next, in the attribution degree calculation block 14, the attribution degree to each category (for example, vehicle, person, and low position (height) object) of the extracted second feature quantity is calculated.

The preliminarily created attribution degree database 15 is used for calculating the attribution degree.

The attribution degree database 15 represents distribution conditions of the second feature quantity for each relative distance about a predetermined category.

FIG. 3 shows a typical view of the attribution degree in the case where the category is classified into a category 1 (low position (height) object), a category 2 (person), and a category 3 (vehicle) in a certain relative distance R of the second feature quantity.

Figure 4:
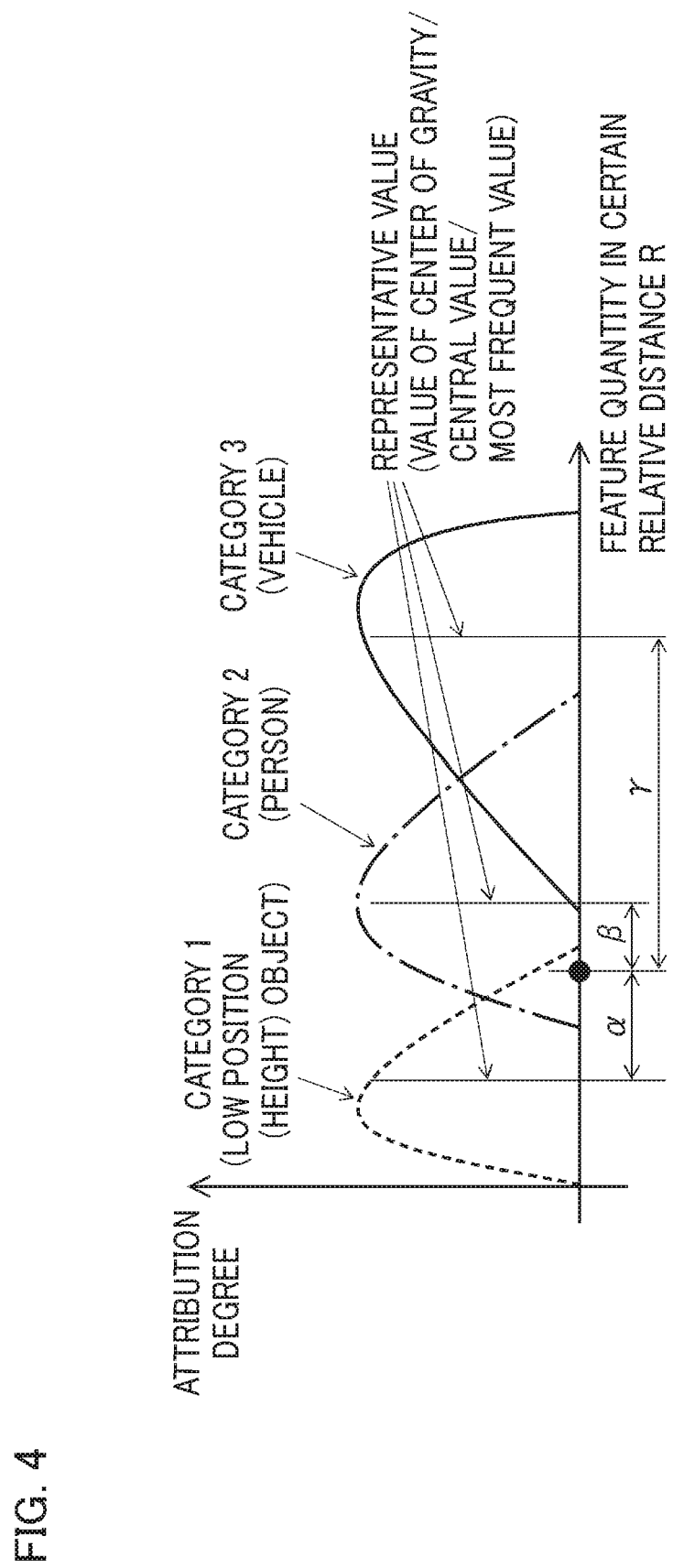
FIG. 4 is an explanation view exemplarily showing the distribution of a different attribution degree in the radar signal processing device according to Embodiment 1 of the present invention.

Furthermore, FIG. 4 shows a typical view showing the case where different expression of the attribution degree of the same conditions is used.

FIG. 3 is a view in which the attribution degree (vertical axis) over the entire feature quantity (horizontal axis) is represented in a distributed shape; and FIG. 4 is a view expressed by a representative value (for example, value of the center of gravity, central value, and most frequent value) in a range of value of each category.

Incidentally, a method of creating the attribution degree database 15 is not limited to the above, but, for example, the entire range of value of each category can also be represented in a rectangular shape.

Furthermore, an overlap portion of each category can be such that a value divided by the number of overlaps is the distribution of the attribution degree of each category. In the case where the attribution degree database 15 is created by the representative value such as FIG. 4, the area (memory) of database can be cut down.

The attribution degree database 15 can be created by obtaining several examples of sample (teacher data) of each category.

For example, in order to obtain the distribution of the attribution degree of FIG. 3, creation can be performed by normalizing a maximum value after creating a histogram of the sample (teacher data). Furthermore, although the distribution of the attribution degree is created for each relative distance R in the example of FIG. 3, characteristics for each distance can also be finely reflected by setting the relative distance small (for example, 1 m) and therefore a highly accurate object identification can be achieved. Moreover, areas having similar characteristics in the second feature quantity are collected and the relative distance is largely set to be, for example, like far/near distance, whereby the areas (memory) of the database can also be cut down. Additionally, the distribution of the attribution degree can also be created for each relative speed. In this case, like the change quantity of the received power value, it is anticipated that characteristics are different according to the relative speed in the feature quantity that captures a change of a plurality of observation points; however, it can be dealt with that by creating the distribution of the attribution degree for each speed and an effect of reducing deterioration of object identification performance can be expected.

In the case of the distribution of the attribution degree like FIG. 3, when the second feature quantity is a value shown by a black point on the horizontal axis, the calculation of the attribution degree can be performed by allocating a value ($\alpha$, $\beta$, $\gamma$) of each category distribution in the feature quantity.

Furthermore, in the case of the representative value of the attribution degree like FIG. 4, the attribution degree can be allocated by a value of the second feature quantity and a distance (or its inverse number) of the representative value of the attribution degree.

Next, in the object determination block 16, the attribution degree of the second feature quantity inputted from the attribution degree calculation block 14 is multiplied by a predetermined weight coefficient of the second feature quantity, summation is calculated, and then one having the highest summation value is outputted as the category of the object.

Figure 5:
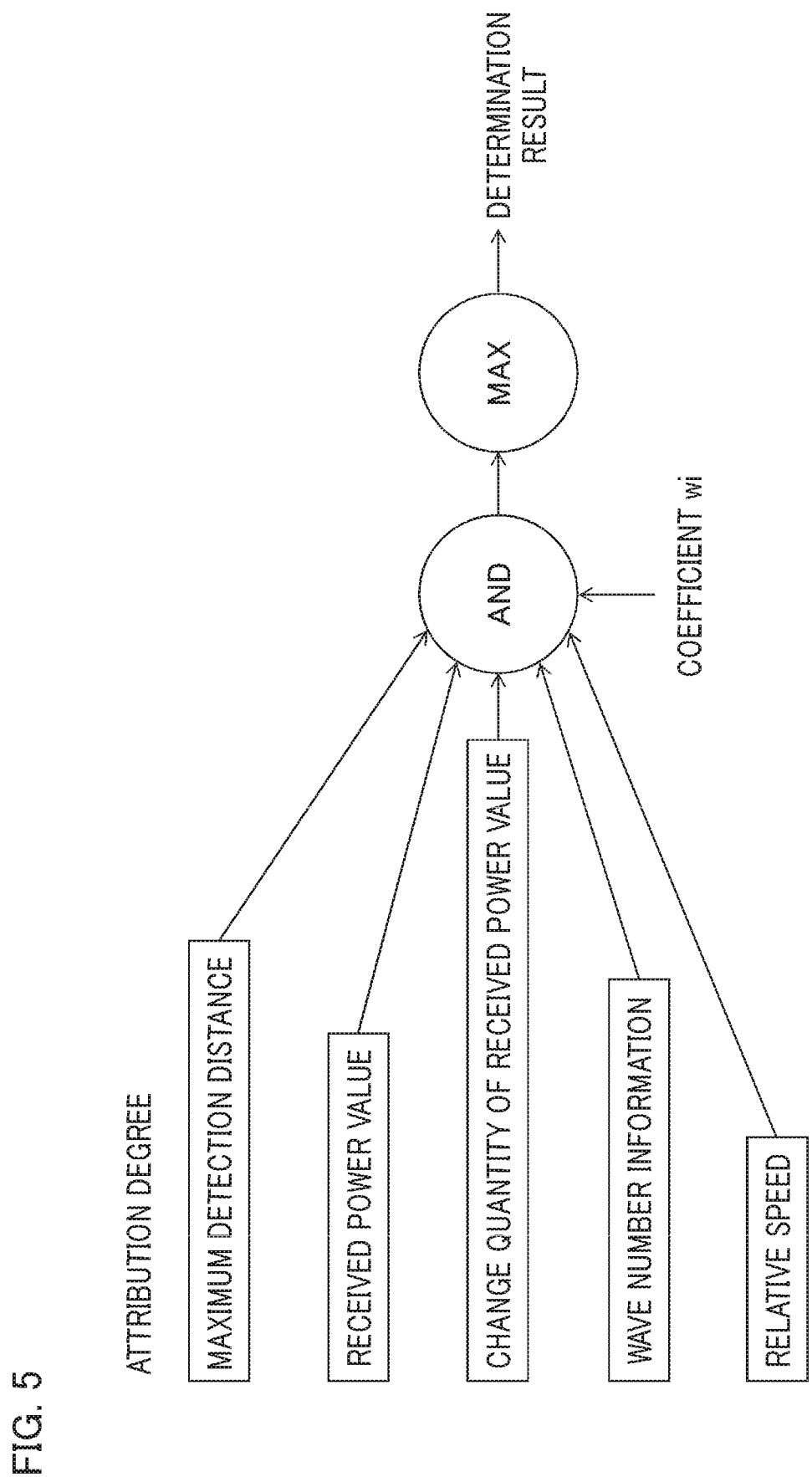
FIG. 5 is an explanation view exemplarily showing object determination processing in the radar signal processing device according to Embodiment 1 of the present invention.

FIG. 5 shows a conceptual view of object determination processing. In the same drawing, a coefficient $w_i$ is the weight coefficient of each preliminarily defined second feature quantity.

Incidentally, in the configuration of FIG. 5, the relative speed is added to the second feature quantity. Furthermore, a determination result of the previous observation time or a result determined until then can also be inputted as the second feature quantity. In this configuration, by inputting the previous determination result, a stable determination result can be obtained even when the present observation value is missing and/or is deteriorated by noise and the like and, more than that, the past determination result is taken over; and therefore, an effect that obtains a more reliable determination result can be expected.

The weight coefficient in the determination processing can be set according to a degree of influence to the determination of each second feature quantity.

For example, when the degrees of influence of ail the second feature quantities are equal, all the weight coefficients are set to the same value (for example, 1).

Furthermore, when the degree of influence of each secondary feature is different according to the relative distance, a more highly accurate object identification can be achieved by changing the weight coefficient for each relative distance.

As a method of outputting the determination result, summation values of all categories can also be outputted in addition to the method of outputting the category of the highest summation value.

In this case, the summation value of each category can be considered as a ratio belonged to each category of the object or reliability. Incidentally, in this case, the determination result can be easily interpreted by representing in value normalized by the maximum value of the summation value or in percentage.

Furthermore, when the summation value is less than a predetermined summation threshold value, it can also be outputted as an indeterminate category that is not belonged to the predetermined category. Moreover, when the difference between the highest summation value and a next higher summation value is less than a predetermined threshold value, it is regarded that categories cannot be narrowed down into one and it can also be outputted as indeterminable.

By performing the output which is indeterminate and/or indeterminable in such a manner, it is possible to avoid that classification is made into a predetermined category in a state of having no reliability and, as a result, the category is mistaken and determination accuracy is deteriorated.

At this time, the indeterminate category is appended as a new category in the next and succeeding processing, whereby the database can be extended and a determination can be made properly next time or later.

Incidentally, in the above embodiment, the respective second feature quantities are all equally treated. However, for example, feature quantities having a high degree of influence on a certain category are determined at an initial stage; and after the categories are narrowed down, the remaining category can also be determined.

The final determination accuracy can be improved by performing such processing.

As described above, in the radar signal processing device according to the present embodiment, an effective (remarkable in difference) feature quantity in discrimination of the vehicle, the person, and the low position (height) object, such as, the change quantity of the received power value is extracted from information of the radar alone and the category is determined; and therefore, a highly accurate object identification can be performed without complicating a system configuration.

Furthermore, in the radar signal processing device according to the present embodiment, the category is determined for each distance by the use of the feature quantity whose characteristics change for each distance; and therefore, a highly accurate object identification can be performed. More specifically, the category (kind) of the object is determined on the basis of the measurement results for each distance of the object obtained by the radar; and therefore, a highly accurate object identification can be achieved irrespective of the distance. Incidentally, the attribution degree is calculated for each distance of one own vehicle and the object in the calculation of the attribution degree.

Moreover, in the radar signal processing device according to the present embodiment, the category is determined on the basis of the observation values not less than two observation cycles; and therefore, instantaneousness of determination can be improved. Incidentally, in the case of not using the change quantity of the received power value, the determination can be made by one observation cycle.

Additionally, in the radar signal processing device according to the present embodiment, the determination is performed by extracting a plurality of feature quantities; and therefore, the determination can be made even when the feature quantity cannot be obtained by a partial missing and the like.

Embodiment 2

As a different Embodiment 2 of the present invention, it is conceivable that the distribution of an attribution degree is created for each mounting position (height) of one's own vehicle's radar.

As described above, a radar reflection wave is different in characteristics such as the presence or absence of the occurrence of multipath propagation by the height of an object and the mounting position (height) of one's own vehicle's radar.

Thus, when the mounting position (height) of one's own vehicle's radar is changed by vehicle types and other conditions, a more accurate determination can be performed than using the distribution of attribution degree (database) specialized to its mounting position (height).

As described above, according to a radar signal processing device of the present Embodiment 2, the distribution of the attribution degree is created/changed for each mounting position (height) of one's own vehicle's radar; and therefore, a more highly accurate object identification can be performed.

The present invention can freely combine the respective embodiments and appropriately modify and/or omit the respective embodiments, within the scope of the present invention.

DESCRIPTION OF REFERENCE NUMERALS

Figure 6:
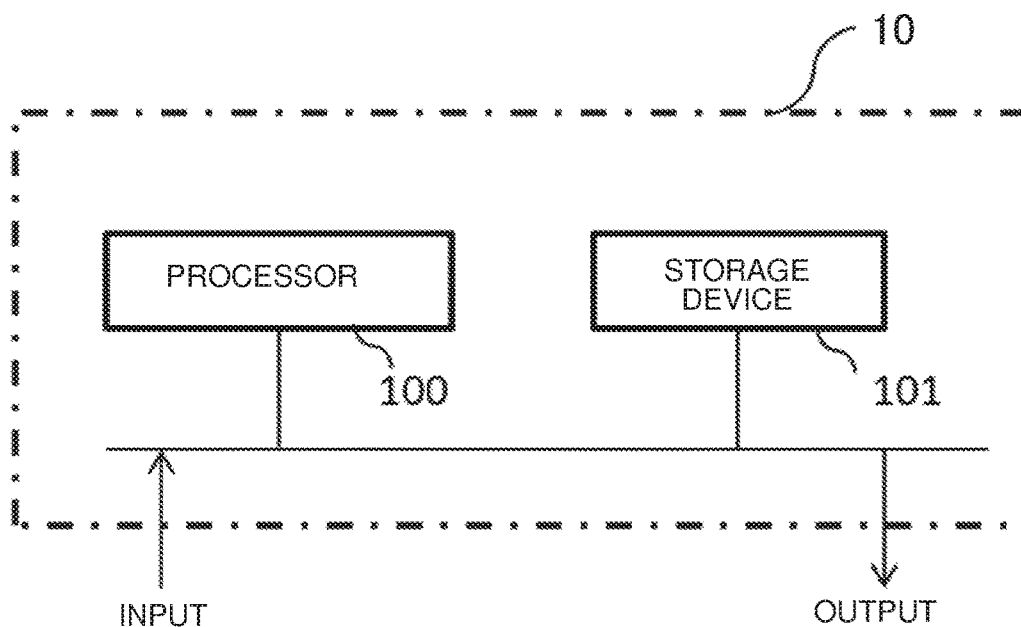
FIG. 6 is a configuration diagram showing an example of hardware of a radar signal processing device according to Embodiment 1 of the present invention.

FIG. 6 shows an example of hardware of the radar signal processing device 10. The radar signal processing device 10 is composed of a processor 100 and a storage unit 101 as shown in FIG. 3. The storage unit 101 includes, although not shown, a volatile storage device such as a random access memory, and a nonvolatile auxiliary storage device such as a flash memory. The storage unit 101 may include, instead of a flash memory, an auxiliary storage device such as a hard disk. The processor 100 executes a program loaded from the storage unit 101. In this case, the program is loaded from the auxiliary storage device to the processor 100 via the volatile storage device. The processor 100 may output data of the calculation result and the like to the volatile storage device of the storage unit 101, or may store the data in the auxiliary storage device via the volatile storage device.

The invention claimed is:

1. A radar signal processing device of a radar, which is mounted on a vehicle and outputs information related to a plurality of circumferentially existing objects, said radar signal processing device comprising:
a first feature quantity extraction block which extracts information as a first feature quantity at a constant time cycle from a received signal of the radar, the information indicating at least a relative distance and a relative speed of an object with respect to a plurality of objects and a direction and a reflection intensity of the object;
a data storage processing block which stores the first feature quantity and associates a plurality of the first feature quantities with the same object in time series over a plurality of cycles;
a second feature quantity extraction block which extracts a second feature quantity from the first feature quantity in said data storage processing block;
an attribution degree calculation block which calculates an attribution degree of the second feature quantity based on a histogram indicating a relation between the attribute degree and an entire feature quantity including the second feature quantity and the second feature quantity in the relative distance, for a plurality of preliminarily defined categories; and
an object determination block which determines a category of the object based on the attribution degree of the second feature quantity.

2. The radar signal processing device according to claim 1, wherein, as the second feature quantity, a maximum detection distance of the object is extracted.

3. The radar signal processing device according to claim 1, wherein, as the second feature quantity, a received power value in which a rapid change caused by a noise and a multipath from a reflection strength obtained as the first feature quantity is suppressed is extracted.

4. The radar signal processing device according to claim 1, wherein, as the second feature quantity, a quantity difference between a power value of the received signal and a power value of a previously received signal, is extracted.

5. The radar signal processing device according to claim 1, wherein, as the second feature quantity, wave number information that is obtained during an angle measurement by the radar is extracted.

6. The radar signal processing device according to claim 1, wherein the attribution degree includes at least two attribution degree values corresponding to two or more of the plurality of preliminarily defined categories, and wherein, in the object determination, a summation value of the at least two attribution degree values is used.

7. The radar signal processing device according to claim 1, wherein the attribution degree includes at least two attribution degree values corresponding to two or more of the plurality of preliminarily defined categories, and wherein, in the object determination, the category of the object is determined based on a weighted summation value of the at least two attribution degree values.

8. The radar signal processing device according to claim 6, wherein, in the object determination, when the summation value is less than a preliminarily defined threshold value, the category of the object is regarded as indeterminable and a new category is assigned to the object.

9. The radar signal processing device according to claim 7, wherein, in the object determination, when the summation value is less than a preliminarily defined threshold value, the category of the object is regarded as indeterminable and a new category is assigned to the object.

10. The radar signal processing device according to claim 1, wherein the attribution degree is changed for a mounting height position of the radar.

* * * * *